Aug. 4, 1936.  E. F. NORELIUS ET AL  2,049,858

TRACTOR FRAME SUSPENSION

Filed Oct. 6, 1930   3 Sheets-Sheet 3

Inventors
E. F. Norelius
W. H. Yount by

Attorney

Patented Aug. 4, 1936

2,049,858

UNITED STATES PATENT OFFICE 2,049,858

TRACTOR FRAME SUSPENSION

Emil F. Norelius and Willis H. Yount, Springfield, Ill., assignors to Allis-Chalmers Manufacturing Company, Milwaukee, Wis., a corporation of Delaware Application October 6, 1930, Serial No. 486,536

9 Claims. (Cl. 305—9)

This invention relates to tractors of the self-laying track type and more particularly to improvements in the organization of those elements by which the main frame of a tractor is suspended from the self-laying track units.

Various means have been suggested already for providing a certain amount of flexibility between the main frame and the self-laying track units of a tractor, that is, to allow the track units to adjust themselves independently of each other to irregularities of the ground over which the tractor is being driven. The accomplishment of this result, however, has always been connected with the more or less difficult problem of holding the track units in their proper relation to the main frame and properly stabilizing them so that they stay in the correct vertical and lengthwise alignment with the frame. According to a common practice the track units are pivoted at the rear either on the rear axle or on a cross shaft at the rear, which serves as a stabilizing shaft, and at the front end the weight of the main body of the tractor is taken up by an equalizing element associated with the main frame and the track units. In a particular case it has also been suggested to prevent the front portion of the track units in a tractor structure from moving laterally by mounting a crank on each of the track frames, and pivotally connecting these cranks to the main frame of the tractor structure. This device, however, was deficient in many respects and not adapted to allow flexibility between the main frame and the track units in a satisfactory manner.

It is an object of the invention to provide a stabilizing mechanism for a track-laying type of tractor, employing stabilizing cranks which prevent the track units from moving laterally but allow an adequate up and down movement of the track units relative to the main frame of the tractor without setting up any detrimental stresses.

Another object of the invention is to provide an improved tractor of the self-laying track type in which track frames, pivoted at their rear ends to the main frame on a transverse axis, have an adequate freedom of oscillating movement about that axis and are connected with the main frame, forwardly of said axis, so as to be prevented not only from toeing in and out with respect to the main frame but also from lateral tilting or tipping on edges longitudinally of the tractor, for instance on the inner or outer longitudinal edges of the track belt portions in contact with the ground.

Another object of the invention is to provide improved stabilizing mechanism performing the two-fold function of preventing toeing in and out of the track frames and of preventing lateral tilting or tipping of each track frame relative to the main frame on an edge longitudinally of the tractor.

A still further object of the invention is to relieve the shaft or shaft elements on the rear end of the tractor, which serve to provide pivotal connections between the track frames and the main frame, to a considerable extent from the function of holding the track frames properly alined with each other and with the main frame, and from the function of holding the track frames in their proper vertical or upright positions.

Another object of the invention is to provide improved stabilizing mechanism which is simple and compact in construction and efficient in operation.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Figure 1:
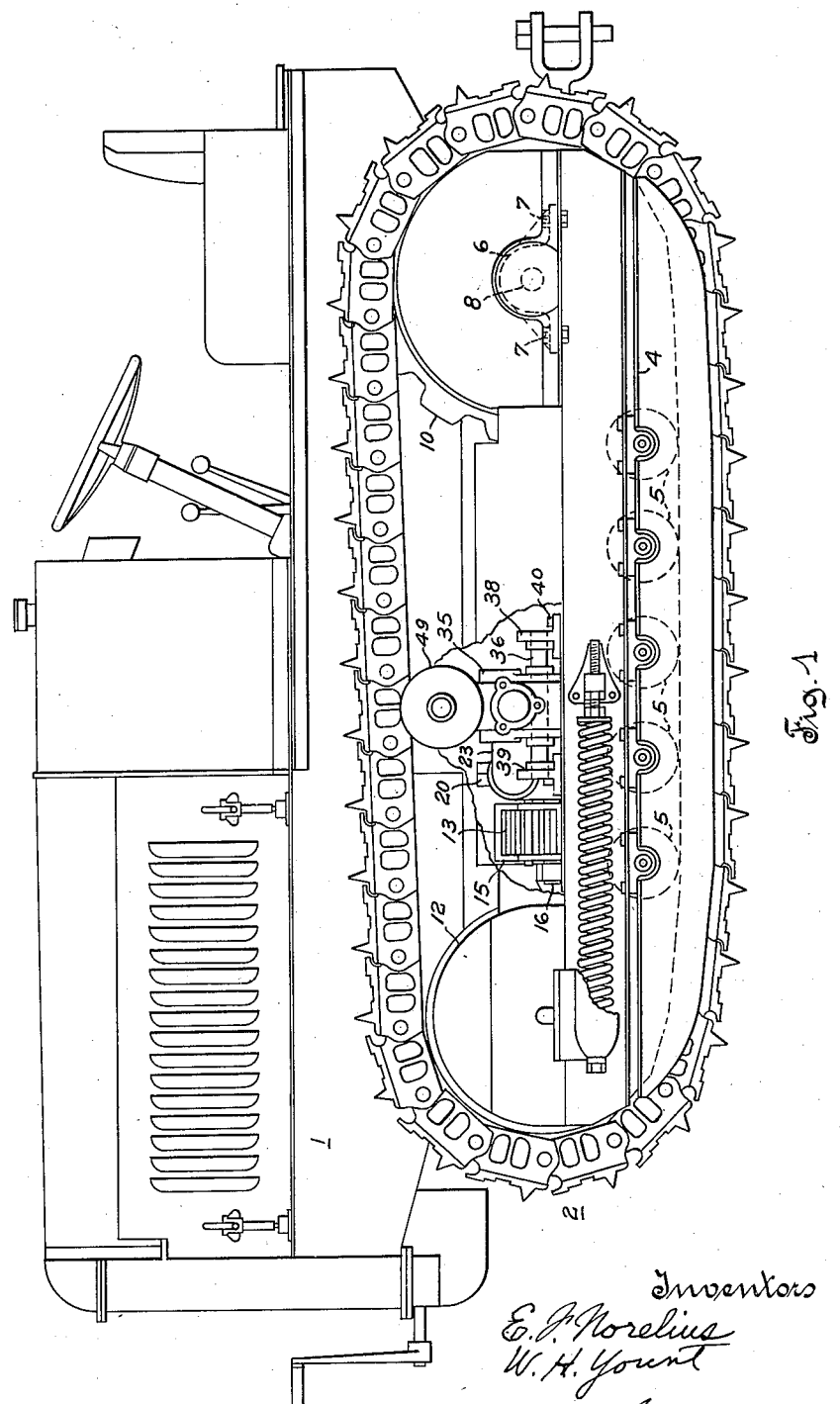
Fig. 1 is a side elevation of a tractor, the upper mud guard on the left track unit being partly broken away to show the crank stabilizer and the equalizing spring.

The numeral 1 indicates generally the main body of the tractor, and 2 and 3 indicate, also generally, the left hand and the right hand track units, respectively. Each track unit comprises a track frame 4 to which load supporting rollers 5 are fastened by means of suitable bearings. At its rear end the track frame 4 carries a bearing 6 which is securely fastened to the top surface of the frame by means of bolts 7. Journaled in the bearing 6 is a stub shaft 8 projecting laterally from the rear end of the main body 1 and firmly held therein in any suitable manner. A similar stub shaft 9 projects from the opposite side of the main body 1 and cooperates with the right hand track unit 3 in a similar manner as the stub shaft 8 with the left hand track unit 2. Rotatably mounted on each stub shaft is a sprocket wheel, indicated by 10 and 11 respectively, which cooperates with the track belt on each side of the tractor. The sprocket wheels are driven in any suitable manner, preferably by a final drive gear which, however, is not shown in the drawings. At the front end each track belt is guided over an idler roller 12 which is slidably supported on the main frame 4. From the description as has been given so far it will be seen that each track unit is pivoted at the rear end of the tractor on the stub shaft 8 or 9, and it will now be described how the front end of the tractor main body is connected to the track units.

Figure 5:
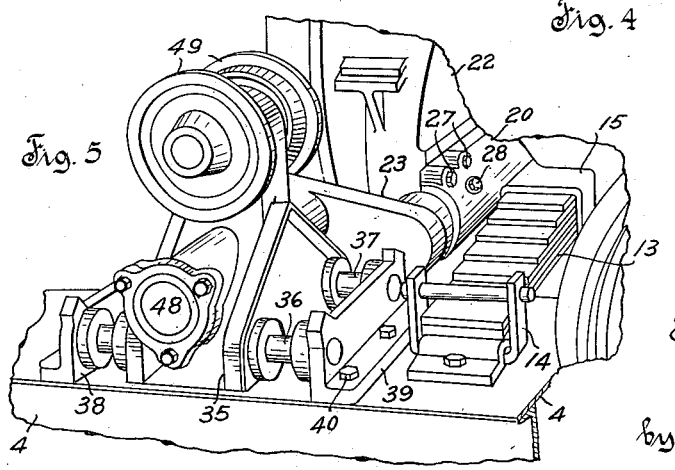
Fig. 5 is a perspective view showing the crank stabilizer and parts associated therewith.

A leaf spring 13 (Figs. 2 and 5) extends transversely between the track units and rests with its ends in brackets 14 securely fastened to the top surface of the track frames 4. The brackets 14 merely serve to guide the ends of the springs and allow sliding motion of the spring ends when the track units move up or down. At its center the spring 13 is embraced by a sleeve 15 which has a downwardly projecting extension in which a pin 16 (Fig. 3) is held in a horizontal position at right angles to the spring. The pin 16 is supported at its forward end by a bearing 17 secured to the bottom of the oil pan 18 of the motor while the rear end of the pin is supported by a lug 19 projecting downwardly from a cap 20 which is bolted to a corresponding extension 21 of the motor crank case 22.

Figure 2:
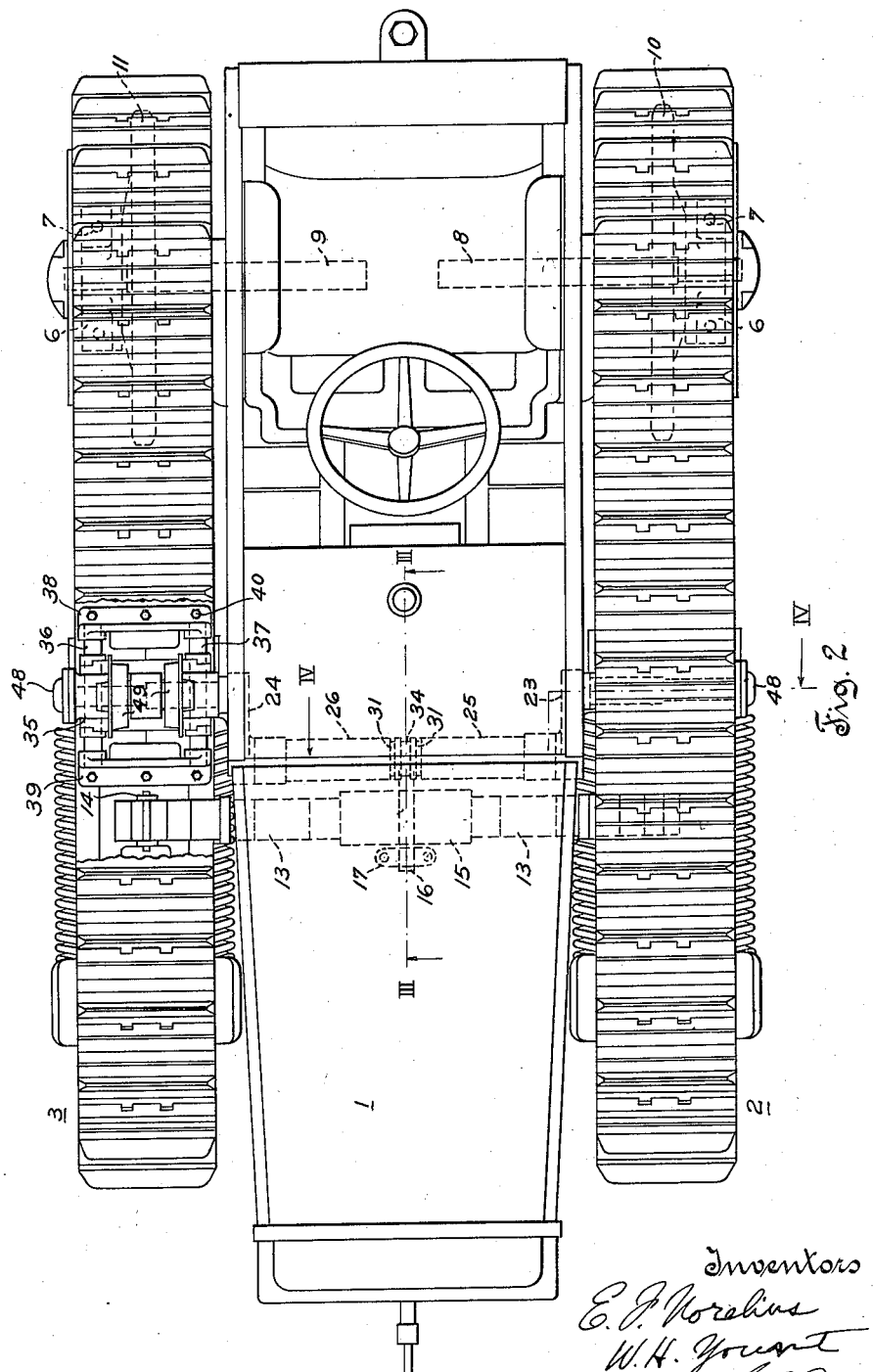
Fig. 2 is a top plan view of the tractor shown in Fig. 1, part of the right hand track belt being broken away to show the supporting rollers for the upper run of the track belt.
Figure 3:
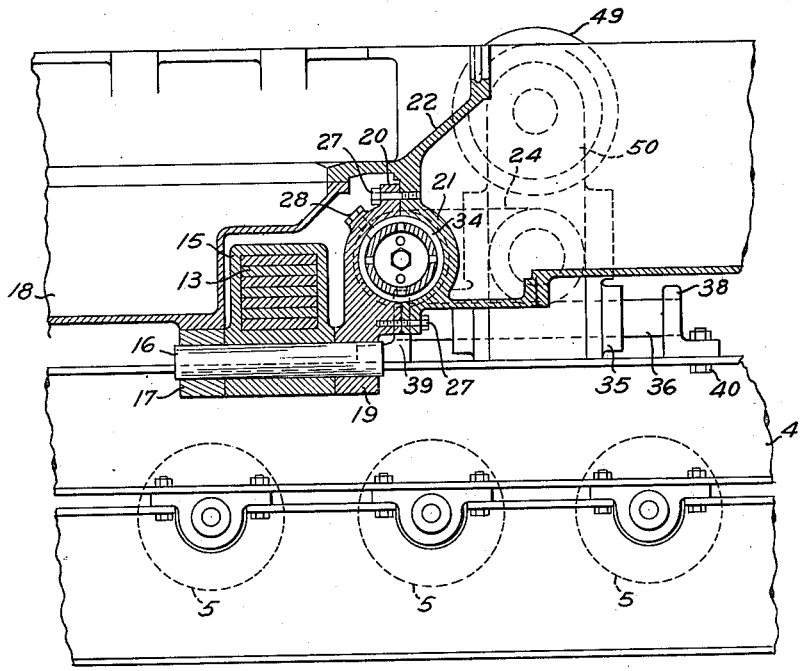
Fig. 3 is a view showing a detailed section on line III—III of Fig. 2 on an enlarged scale.
Figure 4:
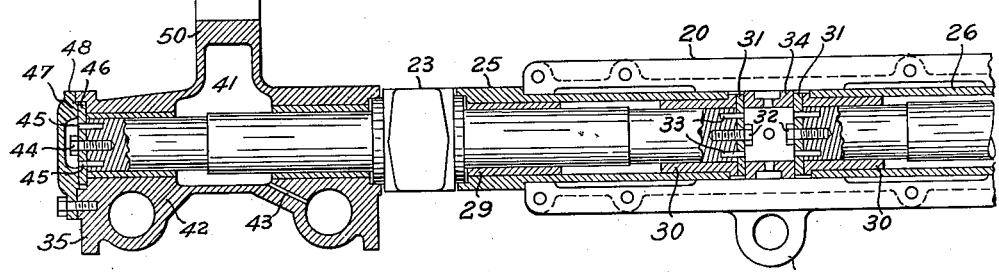
Fig. 4 is a view showing a detail section on line IV—IV of Fig. 2 on an enlarged scale.

Stabilizing cranks 23 and 24 are mounted with their inner crank pins on the main body of the tractor and with their outer crank pins in sliding brackets on the track units. The downwardly projecting extension 21 of the motor crank case and the cap 20 which have been mentioned before extend over a considerable length transversely between the track units and retain two sleeve members 25 and 26 projecting laterally from the crank case extension and the cap. By tightening the bolts 27 which hold the cap 20 and the motor crank case extension 21 together the sleeves are firmly clamped in between these parts and a set screw 28 for each of the sleeves insures a definite position for each of them. Each of the sleeves embraces two bushings 29 and 30 in which the inner crank pin of the respective stabilizing crank is journaled. To the inner end of each stabilizing crank a thrust washer 31 is secured by means of a bolt 32 and a pair of dowel pins 33. The washers 31 are kept in spaced relation by a spacer 34 which in turn is prevented from falling out by the crank case extension 21 and the cap 20. It will be apparent that any outward thrust acting upon one of the stabilizing cranks will be taken up by the thrust washer 31 and the cooperating bushing 30 which is coordinate with the main body of the tractor. An inward thrust, on the other hand, acting upon one of the stabilizing cranks will be transmitted through the spacer 34 upon the inner sleeve 30 engaging the other stabilizing crank and will thus be taken up in the same manner as if an outward thrust were acting upon that other stabilizing crank. The outer crank pin of each stabilizing crank is journaled in a saddle bearing 35 which is slidably mounted on top of the track frame 4 of the respective track unit, the effective width of the bearing portion wherein the crank pin is journaled being substantially equal to the width of the track frame 4, as best shown in Figs. 2 and 4. The saddle bearing is supported by two parallel shafts 36 and 37 extending in the longitudinal direction of the frame and mounted in suitable brackets 38 and 39 which are secured to the frame 4 by means of bolts 40 as shown. Between the saddle bearing and the brackets 38 and 39 a clearance is provided to allow the saddle bearing to slide back and forth on the shafts 36 and 37 when the track unit oscillates about the shaft on which it is pivoted at the rear end of the tractor. The gaps between the saddle bearing and the brackets are preferably covered by leather boots, which are not shown in the drawings, to prevent the entrance of dirt. A hollow space 41 (Fig. 4) within the saddle bearing is provided to receive lubricant which may not only keep the crank pin in the bearing but also the shafts 36 and 37 lubricated, suitable passages 42 and 43 being provided for this purpose. Secured to the end of the outer crank pin by means of a bolt 44 and a pair of dowel pins 45 is a thrust washer 46 which cooperates with the bearing 35 to take up any outward thrust imparted on the track unit on which the bearing is mounted. An inward thrust, on the other hand, acting upon the track unit is taken up by a shoulder 47 of a cap 48 which is bolted to the saddle bearing 35 as shown. The cap 48 covers the thrust washer 46 and the bolt 44 to prevent the entrance of dirt into the saddle bearing, as more clearly shown in Fig. 5.

The upper run of the track belt is supported by a pair of rollers 49 which are mounted on an upwardly projecting extension 50 of the saddle bearing 35. This arrangement provides a convenient and inexpensive support for the upper run of the track belt.

Referring to the forward connections between the main body or main frame 1 and the left and right track units 2 and 3, it should be noted that the left stabilizing crank 23 which connects the track frame 4 of the left track unit 2 with the main frame, as well as the stabilizing crank 24 which connects the track frame 4 of the right track unit 3 with the main frame, each have a comparatively long and sturdy inner crank pin or journal, and a similarly long and sturdy outer crank pin or journal, and that the cheek of each stabilizing crank is likewise comparatively strong and heavy. The bearings for the crank journals are of suitable length to correspond to the length of the journals and afford wide supports for the stabilizing cranks. The connections between the bearings for the inner crank journals and the main frame, as well as the connections between the bearings for the outer crank journals and the track frames are sufficiently strong, as shown in the drawings, to carry substantial loads, and the stabilizing cranks are effectively prevented from axial displacements within the bearings in either direction, as explained hereinbefore. The combined effect of these various features is that the stabilizing cranks are particularly adapted not only to take up horizontal transverse thrust forces which tend to cause toeing in and out of the track frames but are also adapted to take up lateral tilting forces which tend to tip the track frames laterally relative to the main frame. It should further be noted from Fig. 1 that the saddle bearing 35 for the left stabilizing crank 23 is mounted on the track frame 4 of the left track unit 2 in a position midway between a vertical plane through the axis of stub shaft 8 and a vertical plane forwardly tangential to the track supporting rim of the front idler 12. The saddle bearing 35 for the right stabilizing crank 24 is similarly mounted on the track frame 4 of the right track unit 3, as may be seen from Fig. 2. Due to this arrangement of the outer crank journals relative to the track frames, the stabilizing cranks are effective in themselves to take up effectively transverse thrust both at the front and at the rear of the track frames, and they effectively prevent toeing in and out and lateral tilting of the track frames in operation, for instance, during a pivot turn of the tractor; and it is not necessary to rely upon the rearward connections of the track frames with the main frame to any considerable extent for further stabilization of the track frames.

Referring further to the rearward connections between the main frame and the left and right track units, it should be noted that the stub axles 8 and 9 project laterally from the track belt drive sprockets 10 and 11, and that the track frames are solely connected to the outer ends of the stub shafts by means of the narrow bearings 6, there being no other bearings connecting the track frames with any other parts of the stub axles, or any other connections between the track frames and the main frame at the rear of the tractor. The rearward connections between the main frame and the track frames by means of the stub axles 8 and 9 and the narrow bearings 6 afford, as will be seen, no substantial stabilization of the track frames against toeing in or out and against lateral tilting, and if it were not for the forward connections by means of the stabilizing cranks, the intense transverse thrust and lateral tilting forces which act upon the track frames during a pivot turn of the tractor or under other conditions of operation frequently encountered, would easily wreck the rearward connections. With the stabilizing cranks, however, capable of taking up effectively transverse thrust and lateral tilting forces, as explained hereinbefore, the rearward connections are relieved from practically all stabilizing functions, and the principal function which remains to be performed by the rearward connections is to retain the right and left track frames on the main frame for pivotal movements about the axes of the stub shafts 8 and 9. In order to perform this function efficiently the rearward connections do not have to be very strong, and the construction disclosed in the drawings is entirely adequate for this purpose. It should further be noted that the narrow bearings 6 at the rear ends of the track frames and at the axially outer sides of the track belt drive sprockets do not interfere with the drive mechanism for said drive sprockets, and they make it possible to accessibly mount the track frames on the main frame so as to be able to take them off and replace them in a convenient manner. The equalizing leaf spring and the stub shafts 8 and 9 take the full weight of the main body allowing the stabilizing cranks to perform the one purpose of securing proper oscillation.

It should be understood, however, that it is not intended to limit the invention to the exact details of construction herein shown and described, for various modifications within the scope of the claims may occur to persons skilled in the art.

It is claimed and desired to secure by Letters Patent:

1. In a tractor, a main frame, a track frame at each side of said main frame connected thereto for rocking movement in a vertical plane, and a crank type connection between said main frame and each of said track frames for guiding said track frames in their rocking movements, each of said crank type connections including a stationary journal bearing on said main frame, a movable journal bearing slidably mounted on the respective track frame, and a crank element having a portion journaled in said stationary journal bearing and another portion journaled in said slidably mounted journal bearing.

2. In a tractor, a main frame, a track frame at each side of said main frame connected thereto for rocking movement in a vertical plane, and a crank type connection between said main frame and each of said track frames for guiding said track frames in their rocking movements, each of said crank type connections including a stationary journal bearing on said main frame, a pair of bracket members on the respective track frame relatively spaced apart in the longitudinal direction thereof, a pair of guide rods extending between said bracket members, a journal bearing structure slidably supported by said guide rods, and a crank element having a portion journaled in said stationary journal bearing and another portion journaled in said slidably supported journal bearing.

3. A vehicle of the self-laying track type, comprising a main frame, a right and a left track frame at opposite sides of said main frame, means connecting each of said track frames at its rear end to said main frame for vertical rocking movements relative thereto, a journal bearing on each of said track frames forwardly of said connecting means, a right and a left journal bearing on said main frame, a right stabilizing crank journaled in said right journal bearing on said main frame and in said journal bearing on said right track frame, a left stabilizing crank journaled in said left journal bearing on said main frame and in said journal bearing on said left track frame, and means for securing one of said journal bearings for each stabilizing crank on its respective frame for straight movement of translation relative thereto, the other bearing for each stabilizing crank being rigidly secured on its respective frame.

4. A vehicle as set forth in claim 3, in which one of the bearings for each stabilizing crank is secured on its respective frame for straight movement of translation longitudinally of the vehicle.

5. In a track laying tractor, a main frame, track belt drive sprockets rotatably mounted on said main frame at opposite sides thereof, track frames swingably connected at their rear ends to said main frame solely at the axially outer sides of said drive sprockets, and stabilizing means for said track frames, including stabilizing cranks connected to said track frames, intermediate the forward and rearward ends of the latter, and to said main frame, said stabilizing means being so constructed, mounted and arranged relative to said main and track frames as to prevent toeing in and out and lateral tilting of said track frames.

6. A track laying tractor comprising, a main frame, right and left track frames at opposite sides of said main frame, rearward connecting means between said main frame and said track frames, comprising a right and a left connecting element supported on said main frame, supporting connections between said right and left connecting elements and said right and left track frames, respectively, in laterally spaced relation to said main frame, said rearward connecting means being adapted to retain said track frames on said main frame for pivotal movements relative thereto and constituting the sole pivotal connections of said track frames with said main frame at the rear of the tractor, right and left track belt drive sprockets arranged at opposite sides of said main frame between the latter and said supporting connections of said track frames with said connecting elements, and forward stabilizing means for said track frames, including right and left stabilizing cranks connected respectively to said right and left track frames intermediate the forward and rearward ends of the latter, and to said main frame, said stabilizing means being so constructed, mounted and arranged relative to said main and track frames as to prevent toeing in and out and lateral tilting of said track frames.

7. A track laying tractor as set forth in claim 6, in which each track frame has rotatably mounted thereon, at its forward end, a track supporting wheel, and in which said right stabilizing crank is connected to said right track frame about midway between a vertical transverse plane through the center of pivotal movement of said right track frame and a vertical plane forwardly tangential to said track supporting wheel on said right track frame, and in which said left stabilizing crank is connected to said left track frame substantially midway between a vertical transverse plane through the center of pivotal movement of said left track frame and a vertical plane forwardly tangential to said track supporting wheel on said left track frame.

8. A track laying tractor comprising, a main frame, right and left track frames at opposite sides of said main frame, rearward connecting means between said main frame and said track frames, comprising right and left shaft elements secured to said main frame, a journal bearing on each shaft element in laterally spaced relation to said main frame and secured to a rearward portion of the track frame at the respective side of the tractor, said rearward connecting means being adapted to retain said track frames on said main frame for pivotal movements about the axes of said shaft elements and constituting the sole pivotal connections of said track frames with said main frame at the rear of the tractor, right and left track belt drive sprockets arranged at opposite sides of said main frame between the latter and said rearward journal bearings, and forward stabilizing means for said track frames, adapted to prevent toeing in and out and lateral tilting of said track frames, said forward stabilizing means comprising a journal bearing on each of said track frames intermediate the forward and rearward ends of the latter, a right and a left journal bearing on said main frame, a right stabilizing crank journaled in said right journal bearing on said main frame and in said journal bearing on said right track frame, a left stabilizing crank journaled in said left journal bearing on said main frame and in said journal bearing on said left track frame, and means for securing one of said journal bearings for each stabilizing crank on its respective frame for movement of translation relative thereto, the other bearing for each stabilizing crank being rigidly secured on its respective frame.

9. A track laying tractor as set forth in claim 8, in which each track frame has rotatably mounted thereon, at its forward end, a track supporting wheel, and in which said journal bearing on said right track frame, in which said right stabilizing crank is journaled, is connected to said right track frame about midway between a vertical plane through the axis of said right shaft element and a vertical plane forwardly tangential to said track supporting wheel on said right track frame, and in which said journal bearing on said left track frame, in which said left stabilizing crank is journaled, is connected to said left track frame about midway between a vertical plane through the axis of said left shaft element and a vertical plane forwardly tangential to said track supporting wheel on said left track frame.

EMIL F. NORELIUS.
WILLIS H. YOUNT.